United States Patent Office 3,502,673
Patented Mar. 24, 1970

3,502,673
ARYL-PYRIMIDINE-ALKANOIC ACID DERIVATIVES
Walter Hepworth and Thomas Walton Thompson, Macclesfield, England, assignors to Imperial Chemical Industries Limited, London, England, a corporation of Great Britain
No Drawing. Filed May 16, 1967, Ser. No. 638,726
Claims priority, application Great Britain, June 17, 1966, 27,083/66
Int. Cl. C07d 51/36; A61k 27/00
U.S. Cl. 260—251                                   5 Claims

ABSTRACT OF THE DISCLOSURE

The disclosure relates to phenyl (and benzyl)pyrimidylalkanoic acids and related compounds which possess anti-inflammatory, analgesic and antipyretic activity, processes for making said acids and compounds, pharmaceutical compositions containing at least one of said acids and compounds, and the method of using said acids and compounds in a host needing said activity. Representative of the compounds disclosed are methyl 2-p-chlorophenyl-6-methoxypyrimid-4-ylacetate, diethyl 2-(2-p-chlorophenyl-6-methoxypyrimid-4-yl)malonate, 2-p-chlorophenyl-6-methoxy-4-methylpyrimid-5-ylacetic acid, and methyl α-(2-p-chlorophenyl-6-methoxypyrimid-4-yl)propionate.

---

This invention relates to new pyrimidine derivatives which have useful anti-inflammatory, analgesic and antipyretic activity.

According to the invention we provide pyrimidine derivatives of the formula:

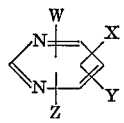

wherein W stands for hydrogen or an alkyl radical of not more than four carbon atoms, X stands for hydrogen, an alkyl or alkoxy radical of not more than 4 carbon atoms, or a halogen atom, Y stands for the phenyl or benzyl radical, either of which may optionally be substituted by one or two halogen atoms or by the trifluoromethyl radical, and Z stands for a radical of the formula —CR¹R²R³, wherein R¹ stands for hydrogen, an alkyl radical of not more than three carbon atoms, or a chlorine or bromine atom, R² stands for hydrogen, an alkyl radical of not more than three carbon atoms, an alkoxycarbonyl radical, or a chlorine or bromine atom, and R³ stands for a radical of the formula —CO₂R⁴ or —CONHR⁵, wherein R⁴ stands for hydrogen or an alkyl, dialkylaminoalkyl or benzyl radical, and R⁵ stands for hydrogen or an amino, dialkylaminoalkyl, alkoxycarbonylalkyl or carboxyalkyl radical, and the salts thereof, provided that the Y and Z radicals are not linked to adjacent carbon atoms in the pyrimidine nucleus, and excluding ethyl 4-chloro-2-phenylpyrimid-5-ylacetate, ethyl 2-phenylpyrimid-5-ylacetate, 2-phenylpyrimid-5-ylacetic acid, ethyl 2-benzylpyrimid-5-ylacetate and ethyl 4-methyl-2-phenylpyrimid-5-ylacetate.

The pyrimidine nucleus is numbered as follows:

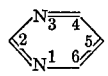

As stated above, in the pyrimidine derivatives of this invention the Y and Z radicals are not linked to adjacent carbon atoms in the pyrimidine nucleus. That is to say, when Y is linked to position 4 to 6, Z is not linked to position 5, and when Z is linked to position 4 or 6, Y is not linked to position 5. Accordingly, it is to be understood that throughout this specification the definitions of the final products and intermediates do not include compounds wherein the Y and Z radicals, or corresponding radicals, are linked to adjacent carbon atoms in the pyrimidine nucleus.

As a suitable value for W when it stands for an alkyl radical of not more than 4 carbon atoms there may be mentioned, for example, the methyl radical.

As a suitable value for X when it stands for an alkyl or alkoxy radical of not more than 4 carbon atoms there may be mentioned, for example, the methyl, methoxy or ethoxy radical. As a suitable value for X when it stands for a halogen atom there may be mentioned, for example, a chlorine or bromine atom.

The halogen substituent(s) which may optionally be present in radical Y may, for example, be selected from fluorine, chlorine and bromine atoms.

One particular embodiment of this invention consists of said pyrimidine derivatives wherein Y is a phenyl or benzyl radical which is substituted by one or two halogen atoms or the trifluoromethyl radical.

As a suitable value for R¹ or R² when either stands for an alkyl radical of not more than 3 carbon atoms there may be mentioned, for example, the methyl radical. As a suitable value for R² when it stands for an alkoxycarbonyl radical there may be mentioned, for example, an alkoxycarbonyl radical of not more than 6 carbon atoms, for example, the ethoxycarbonyl radical.

As a suitable value for R⁴ when it stands for an alkyl radical there may be mentioned, for example, an alkyl radical of not more than 6 carbon atoms, for example the methyl, ethyl or isopropyl radical. As a suitable value for R⁴ or R⁵ when it stands for a dialkylaminoalkyl radical there may be mentioned for example, a dialkylaminoalkyl radical of not more than 8 carbon atoms, for example the β-diethylaminoethyl radical. As a suitable value for R⁵ when it stands for an alkoxycarbonylalkyl radical there may be mentioned, for example, an alkoxycarbonylalkyl radical of not more than 8 carbon atoms, for example the ethoxycarbonylmethyl radical. As a suitable value for R⁵ when it stands for a carboxyalkyl radical there may be mentioned, for example, a carboxyalkyl radical of not more than 6 carbon atoms, for example, the carboxymethyl radical.

As suitable salts in the case while Z stands for an ester or amide group there may be mentioned pharmaceutically-acceptable acid-addition salts, for example a hydrochloride or tartrate. In the case where R³ stands for the carboxy radical (—CO₂H), suitable salts are salts with alkali metals or alkaline earth metals, for example sodium or calcium salts, or aluminium or ammonium salts, or salts with pharmaceutically-acceptable organic bases.

Preferred pyrimidine derivatives of this invention are methyl 2-p-chlorophenyl-6-methoxypyrimid-4-ylacetate, diethyl 2-(2-p-chlorophenyl-6-methoxypyrimid-4-yl)malonate, 2-p-chlorophenyl-6-methoxy-4-methylpyrimid-5-ylacetic acid, and methyl α-(2-chlorophenyl-6-methoxypyrimid-4-yl)propionate.

According to a further feature of the invention we provide a process for the manufacture of pyrimidine derivatives of the formula:

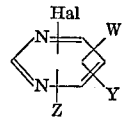

wherein W, Y and Z have the meanings stated above, provided that neither R¹ nor R² stands for a chlorine or bromine atom, and Hal stands for a halogen atom in the 2-, 4- or 6-position, which comprises reacting the corresponding hydroxypyrimidine derivative of the formula:

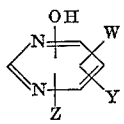

wherein W, Y and Z have the meanings stated above and the hydroxy radical is in the 2-, 4- or 6-position, with a halogenating agent as defined hereinafter.

As a suitable value for Hal there may be mentioned, for example, a chlorine or bromine atom. It is to be understood that in this specification the expression "halogenating agent" means any agent which is known to convert a hydroxy derivative into the corresponding halogeno derivative, for example phosphorus oxychloride or phosphorus oxybromide. The reaction may be carried out in a diluent or solvent, for example benzene, and in the presence of an acid-binding agent, for example N,N-diethylaniline. The reaction may be accelerated or completed by the application of heat. The hydroxy-pyrimidine derivatives used as starting materials may be obtained in conventional manner by the interaction of the appropriate amidine and the appropriate keto ester.

According to a further feature of the invention we provide a process for the manufacture of alkoxy-pyrimidine derivatives of the formula:

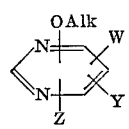

wherein W, Y and Z have the meanings stated above, provided that neither $R^1$ nor $R^2$ stands for a chlorine or bromine atom, and OAlk stands for an alkoxy radical in the 2-, 4- or 6-position, which comprises reacting a halogenopyrimidine derivative of the formula:

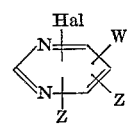

wherein W, Y, Z and Hal have the meanings stated above, with the appropriate alkali metal alkoxide.

The reaction may be carried out in a diluent or solvent, for example the alkanol from which the alkali metal alkoxide is derived, or an aromatic hydrocarbon solvent, for example xylene. The interaction may be accelerated or completed by the application of heat. It is to be understood that, in the case where Z in the starting material stands for an ester radical derived from a different alcohol than that from which the alkoxide reactant is derived, in some cases the product is the ester derived from the alkanol corresponding to the alkoxide. Thus, for example, if the starting material is an ethyl ester, the alkoxide is sodium methoxide, and the solvent is methanol, the product may be obtained as the corresponding methyl ester.

According to a further feature of the invention we provide a process for the manufacture of compounds of the formula:

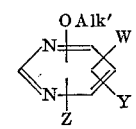

wherein W, Y and Z have the meanings stated above, provided that neither $R^1$ nor $R^2$ stands for a chlorine or bromine atom, and OAlk' stands for an alkoxy radical in the 2-, 4-, 5- or 6-position, which comprises reacting a hydroxypyrimidine derivative of the formula:

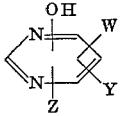

wherein W, Y and Z have the meanings stated above and the hydroxy radical is in the 2-, 4-, 5- or 6-position, with a diazoalkane.

As a suitable diazoalkane there may be mentioned, for example, diazomethane. The reaction may be carried out in a diluent or solvent, for example ether, and at a relatively low temperature, for example at about 0° C.

According to a further feature of the invention we provide a process for the manufacture of pyrimidine derivatives of the formula:

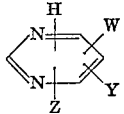

wherein W, Y and Z have the meanings stated above provided that neither $R^1$ nor $R^2$ stands for a chlorine or bromine atom, which comprises dehalogenating a halogeno-pyrimidine derivative of the formula:

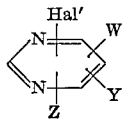

wherein W, Y and Z have the meanings stated above and Hal' stands for a halogen atom in the 2-, 4-, 5- or 6-position.

As a suitable dehalogenating agent there may be mentioned, for example, zinc dust. The reaction may be carried out in a diluent or solvent, for example aqueous dioxan, and it may be accelerated or completed by the application of heat.

According to a further feature of the invention we provide a process for the manufacture of compounds of the formula:

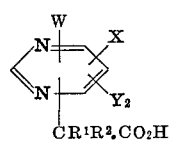

wherein W, X, Y, $R^1$ and $R^2$ have the meaning stated above provided that $R^1$ does not stand for a chlorine or bromine atom and $R^2$ does not stand for a chlorine or bromine atom or an alkoxycarbonyl radical, which comprises hydrolysing a compound of the formula:

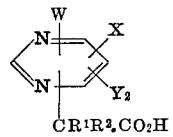

wherein W, X, Y, $R^1$ and $R^2$ have the meanings stated above, and Ac stands for the cyano (—CN) or carbamoyl (—CONH$_2$) radical or a radical of the formula

—CO$_2$R$^6$ wherein $R^6$ stands for an alkyl radical or the phenyl or benzyl radical. As a suitable hydrolytic agent there may be mentioned an inorganic base, for example an alkali metal hydroxide, for example sodium hydroxide, or an acid, for example an inorganic acid, for example hydrochloric or sulphuric acid. The hydrolysis is carried out in the presence of water, and an organic solvent, for example ethanol, may optionally be present. The hydrolysis may be accelerated or completed by the application of heat.

According to a further feature of the invention we provide a process for the manufacture of compounds of the formula:

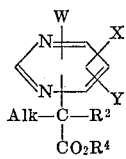

wherein W, X, Y, $R^2$ and $R^4$ have the meanings stated above provided that $R^2$ does not stand for a chlorine or bromine atom, and Alk stands for an alkyl radical of not more than 3 carbon atoms, which comprises α-alkylating a compound of the formula:

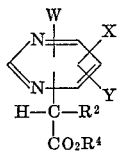

wherein W, X, Y, $R^2$ and $R^4$ have the meanings stated above. The α-alkylation may be carried out by the interaction of an alkali metal derivative, for example the sodium derivative, of the appropriate pyrimidine derivative with an alkyl halide of not more than 3 carbon atoms, for example methyl iodide. The reaction may be carried out in a diluent or solvent, for example ether.

According to a further feature of the invention we provide a process for the manufacture of pyrimidine derivatives of the formula:

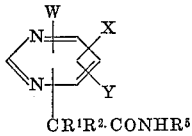

wherein W, X and Y have the meanings stated above, $R^1$ and $R^2$ stand for hydrogen or an alkyl radical of not more than 3 carbon atoms, and $R^5$ stands for hydrogen or an amino or dialkylaminoalkyl radical, and the salts thereof, which comprises reacting a compound of the formula:

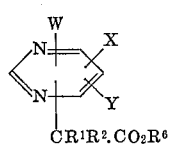

wherein W, X, Y, $R^1$, $R^2$ and $R^6$ have the meanings stated above, with a compound of the formula $R^5NH_2$, wherein $R^5$ has the meaning stated above. As a suitable value for $R^6$ when it stands for an alkyl radical there may be mentioned, for example, an alkyl radical of not more than 4 carbon atoms, for example the methyl or ethyl radical. The reaction may be carried out in a diluent or solvent, for example methanol, and it may be accelerated or completed by the application of heat.

According to a further feature of the invention we provide a process for the manufacture of pyrimidine derivatives of the formula:

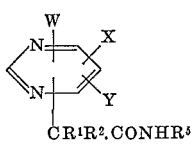

wherein W, X, Y, $R^1$ and $R^2$ have the meanings stated above provided that neither $R^1$ nor $R^2$ stands for a chlorine or bromine atom, and $R^5$ stands for an alkoxycarbonylalkyl or dialkylaminoalkyl radical, and the salts thereof, which comprises reacting a compound of the formula:

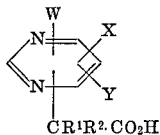

wherein W, X, $R^1$ and $R^2$ have the meanings stated above, with an amine of the formula $R^5NH_2$, wherein $R^5$ has the meaning stated above, in the presence of dicyclohexylcarbodiimide. The reaction may be carried out in a diluent or solvent, for example dry chloroform, at a temperature of about 0° C. The products in which $R^5$ stands for an alkoxycarbonylalkyl radical may be hydrolysed by reaction with a base, for example an alkali metal hydroxide, to give the corresponding compounds in which $R^5$ stands for a carboxyalkyl radical.

According to a further feature of the invention we provide a process for the manufacture of esters of the formula:

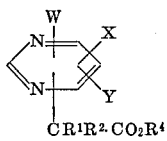

wherein W, X and Y have the meanings stated above, $R^1$ and $R^2$ stand for hydrogen or an alkyl radical of not more than 3 carbon atoms, and $R^4$ stands for an alkyl, dialkylaminoalkyl or benzyl radical, which comprises reacting a salt of the formula:

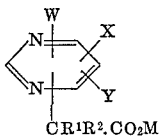

wherein W, X, Y, $R^1$ and $R^2$ have the meanings stated above, and M stands for a metal atom, for example an alkali metal atom, with a compound of the formula $R^4$—Hal, wherein $R^4$ has the meaning stated above and Hal stands for a halogen atom, for example a chlorine or bromine atom. The reaction may be carried out in a diluent or solvent, for example ethanol or acetone.

According to a further feature of the invention we provide a process for the manufacture of esters of the formula:

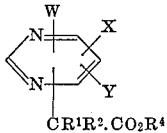

wherein W, X and Y have the meanings stated above, $R^1$ and $R^2$ stand for hydrogen or an alkyl radical of not more than 3 carbon atoms, and $R^4$ stands for an alkyl, dialkylaminoalkyl or benzyl radical, which comprises reacting the appropriate carboxylic acid with a compound of the formula $R^4OH$, wherein $R^4$ has the meaning stated above, in the presence of an inorganic acid, for example sulphuric or hydrochloric acid, or dicyclohexylcarbodiimide. The reaction may be accelerated or completed by the application of heat, and it may optionally be carried out in the presence of an inert diluent or solvent.

According to a further feature of the invention we provide a process for the manufacture of esters of the formula:

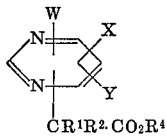

wherein W, X and Y have the meanings stated above, $R^1$ and $R^2$ stand for hydrogen or an alkyl radical of not more than 3 carbon atoms, and $R^4$ stands for an alkyl radical of more than 2 carbon atoms, or a dialkylaminoalkyl or benzyl radical, which comprises reacting an ester of the formula:

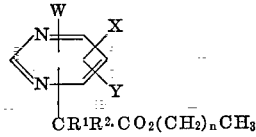

$\overset{|}{C}R^1R^2.CO_2(CH_2)_nCH_3$ wherein W, X, Y, $R^1$ and $R^2$ have the meanings stated above, and $n$ stands for 0 or 1, with an aluminum derivative of the formula $AlOR^4$, wherein $R^4$ has the meaning stated above. The reaction may be carried out in the presence of an excess of the alcohol of the formula $R^4OH$, wherein $R^4$ has the meaning stated above, and/or in the presence of an inert solvent, for example an aromatic hydrocarbon solvent, for example toluene. The reaction may be accelerated or completed by the application of heat.

According to a further feature of the invention we provide a process for the manufacture of the pyrimidine derivatives of the invention wherein $R^1$ stands for a chlorine or bromine atom and $R^2$ stands for hydrogen, an alkyl radical of not more than 3 carbon atoms, or an alkoxycarbonyl radical, or wherein $R^1$ and $R^2$ are selected from chlorine and bromine atoms, which comprises reacting the corresponding compound wherein $R^1$, or $R^1$ and $R^2$, stands or stand for hydrogen, with chlorine or bromine. The reaction may be carried out in the presence of an alkali metal acetate, for example sodium acetate, and/or glacial acetic acid.

According to a further feature of the invention we provide a process for the manufacture of compounds of the formula:

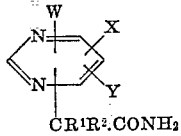

$\overset{|}{C}R^1R^2.CONH_2$ wherein W, X and Y have the meanings stated above, and $R^1$ and $R^2$ stand for hydrogen or an alkyl radical of not more than 3 carbon atoms, which comprises hydrolysing the corresponding nitrile of the formula:

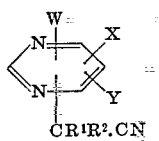

$\overset{|}{C}R^1R^2.CN$ wherein W, X, Y, $R^1$ and $R^2$ have the meanings stated above. As a suitable hydrolytic agent there may be mentioned, for example, an inorganic acid, for example sulphuric acid. The hydrolysis is carried out in the presence of water, and it may be accelerated or completed by the application of heat.

According to a further feature of the invention we provide a process for the manufacture of esters of the formula:

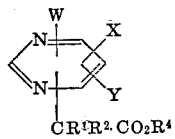

$\overset{|}{C}R^1R^2.CO_2R^4$ wherein W, X and Y have the meanings stated above, $R^1$ and $R^2$ stand for hydrogen or an alkyl radical of not more than 3 carbon atoms, and $R^4$ stands for an alkyl or benzyl radical, which comprises reacting a nitrile of the formula:

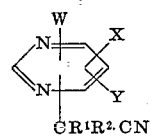

$\overset{|}{C}R^1R^2.CN$ wherein W, X, Y, $R^1$ and $R^2$ have the meanings stated above, or the corresponding amide ($-CR^1R^2CONH_2$) and a compound of the formula $R^4OH$, wherein $R^4$ has the meaning stated above, under acidic conditions. The acidic conditions may be provided by the presence of an inorganic acid, for example sulphuric or hydrochloric acid. The reaction may be accelerated or completed by the application of heat.

According to a further feature of the invention we provide a process for the manufacture of pyrimidine derivatives of the formula:

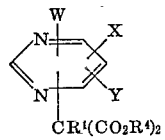

$\overset{|}{C}R^1(CO_2R^4)_2$ wherein W, X and Y have the meanings stated above, $R^1$ stands for hydrogen or an alkyl radical of not more than 3 carbon atoms, and $R^4$ stands for an alkyl radical, provided that the $-CR^1(CO_2R^4)_2$ group is not linked to the 5-position of the pyrimidine nucleus, which comprises reacting sodium or potassium, or a hydride, amide or alkoxide thereof, with a carbonate of the formula $CO.(OR^4)_2$, wherein $R^4$ has the meaning stated above, and a compound of the formula:

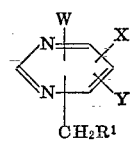

$CH_2R^1$ wherein W, X, Y and $R^1$ have the meanings stated above, and the radical $-CH_2R^1$ is not linked to the 5-position of the pyrimidine nucleus. The reaction may be carried out in an excess of the appropriate carbonate, and it may be accelerated or completed by the application of heat.

According to a further feature of the invention we provide a process for the manufacture of pyrimidine derivatives of the formula:

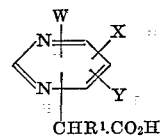

$CHR^1.CO_2H$ wherein W, X and Y have the meanings stated above, and $R^1$ stands for hydrogen or an alkyl radical of not more than 3 carbon atoms, but provided that the $-CHR^1.CO_2H$ group is not linked to the 5-position of the pyrimidine nucleus, and salts thereof, which comprises reacting a compound of the formula:

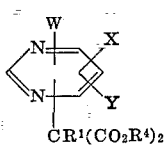

$\overset{|}{C}R^1(CO_2R^4)_2$ wherein W, X, Y and $R^1$ have the meanings stated above, $R_4$ stands for an alkyl radical, and the $-CR^1(CO_2R^4)_2$ group is not linked to the 5-position of the pyrimidine nucleus, with an inorganic base in the presence of water, and under the influence of heat. As a suitable base there may be mentioned, for example, an alkali metal hydroxide. The reaction may be carried out in the presence of an organic solvent, for example methanol.

According to a further feature of the invention we provide a process for the manufacture of pyrimidine derivatives of the formula:

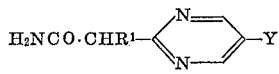

wherein Y has the meaning stated above, and $R^1$ stands for hydrogen or an alkyl radical of not more than 3 carbon atoms, which comprises reacting a compound of the formula:

wherein $R^1$ has the meaning stated above, with a compound of the formula:

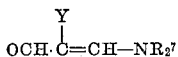

wherein Y has the meaning stated above and $R^7$ stands for an alkyl radical. As a suitable value for $R^7$ there may be mentioned, for example, an alkyl radical of not more than four carbon atoms, for example the methyl radical. The reaction may be carried out in an organic solvent, for example ethanol, and it may be accelerated or completed by the application of heat.

According to a further feature of the invention we provide pharmaceutical compositions comprising at least one pyrimidine derivative of the formula:

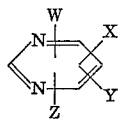

herein W, X, Y and Z have the meanings stated above provided that the Y and Z radicals are not linked to adjacent carbon atoms in the pyrimidine nucleus, or a salt thereof, and an inert, pharmaceutically-acceptable diluent or carrier.

As suitable pharmaceutical compositions there may be mentioned, for example, tablets, pills, capsules, non-sterile aqueous or non-aqueous solutions or suspensions, sterile injectable aqueous or non-aqueous solutions or suspensions, creams, lotions or ointments. These compositions may be obtained in conventional manner using conventional excipients.

The invention is illustrated by the following examples in which the parts are by weight.

EXAMPLE 1

Dry nitrogen is bubbled through a mixture of 280 parts of phosphorus oxychloride and 14.35 parts of N,N-diethylaniline for 30 minutes. 28.2 parts of ethyl 2-p-chlorophenyl-6-hydroxypyrimid-4-ylacetate are added and the mixture is heated under reflux for 30 minutes, by which time evolution of hydrogen chloride has ceased. The excess of phosphorus oxychloride is removed by evaporation under reduced pressure. The residual oil is triturated with ice-water and the solid formed is extracted into 300 parts of ether. The ethereal solution is washed successively with 50 parts of water, 50 parts of saturated sodium bicarbonate solution, and 25 parts of water, and is then dried with anhydrous magnesium sulphate and evaporated to dryness. The residue is crystallised from petroleum ether (B.P. 60–80° C.). There is thus obtained ethyl 6-chloro-2-p-chlorophenylpyrimid-4-ylacetate, M.P. 87–88° C.

The ethyl 2-p-chlorophenyl-6-hydroxypyrimid-4-ylacetate used as starting material may be obtained as follows:

19.1 parts of p-chlorobenzamidine hydrochloride are dissolved in 300 parts of water, and the solution is stirred and to it is added, at ambient temperature, a solution of 10.4 parts of potassium carbonate in 20 parts of water. 10.1 parts of diethyl acetonedicarboxylate are added, and ethanol is then added dropwise with stirring until complete dissolution is achieved. The mixture is stirred at ambient temperature for 18 hours and then filtered. Both the solid residue and the filtrate are retained. The solvent is evaporated under reduced pressure from the filtrate, the residue is cooled, and the resulting mixture is filtered. The two solid residues are combined and dissolved in a mixture of 25 parts of methanol and 75 parts of chloroform. The solution is passed through a column of 350 parts of magnesia-silica gel. The column is eluted with 1500 parts of a 5:95 v./v. methanol:chloroform mixture. The solvent is evaporated under reduced pressure from the eluate and there is thus obtained ethyl 2-p-chlorophenyl - 6 - hydroxypyrimid - 4 - ylacetate, M.P. 169–171° C.

EXAMPLE 2

The process described in Example 1 for the preparation of the 6-chloropyrimidine derivative is repeated except that 10.7 parts of ethyl 6-hydroxy-2-phenylpyrimid-5-yl-acetate, 107 parts of phosphorus oxychloride, and 6.2 parts of N,N-diethylaniline are used. The product is crystallised from ethanol with cooling to −40° C. There is thus obtained ethyl 6-chloro-2-phenylpyrimid-4-ylacetate, M.P. 41° C.

The ethyl 6-hydroxy-2-phenylpyrimid-4-ylacetate used as starting material may be obtained as follows:

31.3 parts of benzamidine hydrochloride are dissolved in 300 parts of water, and a solution of 27.6 parts of potassium carbonate in 30 parts of water is added, with stirring, at ambient temperature. 40.4 parts of diethyl acetonedicarboxylate are added and ethanol is then added dropwise with stirring until complete dissolution is achieved. The mixture is stirred at ambient temperature for 48 hours and then filtered. Both the solid residue and the filtrate are retained. The pH of the filtrate is adjusted to 6 by the addition of dilute acetic acid, whereupon a solid precipitates. This solid is collected by filtration, and the two solids are combined and crystallised from ethanol. There is thus obtained ethyl 6-hydroxy-2-phenylpyrimid-4-ylacetate, M.P. 156–158° C.

EXAMPLE 3

0.9 part of sodium is dissolved in 50 parts of dry methanol, and a solution of 6 parts of ethyl 6-chloro-2-p-chlorophenylpyrimid-4-ylacetate in 150 parts of dry methanol is added dropwise at 15° C. The mixture is stirred for 18 hours at ambient temperature, and water is then added until precipitation is complete. The mixture is filtered; both the solid residue and the filtrate being retained. The solid residue is crystallised from ethanol and there is thus obtained methyl 2-p-chlorophenyl-6-methoxypyrimid-4-ylacetate, M.P. 78–80° C. The filtrate is acidified with 2 N hydrochloric acid, and the resulting mixture is filtered. There is thus obtained, as solid residue, 2-p-chlorophenyl-6-methoxypyrimid-4-ylacetic acid M.P. 123° C. with decomposition.

EXAMPLE 4

5 parts of ethyl 6-hydroxy-2-phenylpyrimid-4-ylacetate are added at 0° C. to a solution of 4 parts of diazomethane in 1000 parts of ether. The mixture is stirred at 0° C. for 18 hours. The excess diazomethane is removed by distillation, and the ether is then evaporated. The residual oil is dissolved in 10 parts of benzene and subjected to chromatography on a column containing 150 parts of magnesia-silica gel. The column is eluted with 600 parts of benzene and then with 100 parts of 5:95 v./v. ethyl acetate:benzene. The solvent is removed from the eluate by evaporation under reduced pressure and the residual oil is distilled in vacuo. There is thus obtained ethyl 6-methoxy-2-phenylpyrimid - 4 - ylacetate, B.P. 146–152° C./0.5 mm., M.P. 43–47° C.

EXAMPLE 5

A mixture of 10 parts of ethyl 2-p-chlorophenyl-4-hydroxypyrimid-5-ylacetate, 20 parts of phosphorus oxychloride and 100 parts of benzene is refluxed for 1.5 hours and then cooled to ambient temperature. An excess of 10% aqueous sodium bicarbonate is added, and the benzene phase is separated, washed with water, and dried with anhydrous magnesium sulphate. The solvent is evaporated and the residue is crystallised from petroleum ether (B.P. 60–80° C.). There is thus obtained ethyl 4-chloro - 2 - p-chlorophenylpyrimid-5-ylacetate, M.P. 94–96° C.

The ethyl 2-p-chlorophenyl-4-hydroxypyrimid-5-ylacetate used as starting material may be obtained as follows:

4.6 parts of sodium are dissolved in 120 parts of dry ethanol and 38 parts of p-chlorobenzamidine hydrochloride are added to the solution, the temperature not being allowed to exceed 10° C. When complete dissolution is obtained, 41 parts of diethyl formylsuccinate are added, the mixture is stirred at ambient temperature for 2 hours, and is then refluxed for 2 hours. The mixture is cooled and then filtered. The solid residue is extracted 4 times with hot chloroform, and the solvent is evaporated from the combined extracts. The residue is crystallized from ethanol, and there is thus obtained ethyl 2-p-chlorophenyl-4-hydroxypyrimid-5-ylacetate, M.P. 235° C.

EXAMPLE 6

A mixture of 5 parts of ethyl 4-chloro-2-p-chlorophenylpyrimid-5-ylacetate, 5 parts of zinc dust, 100 parts of water, and 40 parts of dioxan is refluxed for 48 hours. The mixture is filtered while hot, and the solid residue is washed with 50 parts of hot dioxan. Both the solid residue (A) and the combined filtrate and washings (B) are retained. The solid residue (A) is extracted three times with 100 parts of 5% aqueous sodium hydroxide. The combined extracts are acidified with acetic acid, and extracted with 5 portions of 30 parts of ethyl acetate. The combined ethyl acetate extracts are washed with water, and then dried over anhydrous magnesium sulphate. The solvent is evaporated in vacuo giving a residue (C). The solvent is evaporated in vacuo from the combined filtrate and washings (B), and the residue is combined with residue (C). 10 parts of 8% aqueous sodium hydroxide are added, and the mixture is refluxed for 1½ hours. The solution is cooled and acidified with acetic acid, and is then extracted with 6 portions, each of 30 parts of ethyl acetate. The combined extracts are washed with water, dried with anhydrous magnesium sulphate, and filtered; the solvent is evaporated. The residue is successively crystallized from aqueous ethanol and ethanol, and there is thus obtained 2-p-chlorophenylpyrimid-5-ylacetic acid, M.P. 205–206° C.

EXAMPLE 7

A solution of 0.23 part of sodium in 6 parts of methanol is added to a solution of 3.1 parts of ethyl-4-chloro-p-chlorophenylpyrimid-5-ylacetate in 50 parts of xylene. The mixture is refluxed for 16 hours and the solvent is then evaporated in vacuo. The residue is refluxed for 2 hours with 50 parts of 5% aqueous sodium hydroxide, and the solution is then cooled. The solution is acidified with acetic acid, and extracted 4 times with ethyl acetate. The combined ethyl acetate extracts are washed with water and then dried with anhydrous magnesium sulphate. The solvent is evaporated and the residue is crystallised from methanol. There is thus obtained 2-p-chlorophenyl-4-methoxypyrimid-5-ylacetic acid, M.P. 176–177° C.

EXAMPLE 8

In a similar manner to that described in Example 1, using the papropriate hydroxypyrimidine derivative as starting material, the following compounds are obtained:

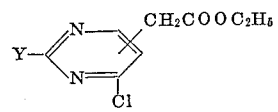

| Y | Position of acetic ester substituent | Melting point (°C.) |
|---|---|---|
| 4-bromophenyl | 4 | 85–86.5 |
| 3,4-dichlorophenyl | 4 | 197–99 |
| 4-chlorobenzyl | 5 | 69–70 |

[1] Initial purification is accomplished by chromatography on a column containing magnesia-silica gel. The column is eluted with chloroform.

The ethyl 2-p-chlorophenyl-6-hydroxypyrimid-4-ylacetate used as starting material above may be obtained as described in Example 1. Alternatively and preferably it can be obtained as follows:

12.64 parts of sodium are dissolved in 50 parts of dry ethanol. 105 parts of p-chlorobenzamidine hydrochloride are dissolved in 400 parts of dry ethanol, and added to the sodium ethoxide solution. 111.1 parts of diethyl acetonedicarboxylate are added and the mixture is heated under reflux for 6 hours. After cooling the solid material is collected by filtration, stirred for 30 minutes with 100 parts of water and again collected by filtration. After drying, the solid material is shaken with 600 parts of chloroform until no more solid dissolves. The chloroform solution is filtered and evaporated to dryness in vacuo. There is thus obtained ethyl 2-p-chlorophenyl-6-hydroxypyrimid-4-ylacetate, M.P. 169–170° C.

In a similar manner, using the appropriate amidine as starting material, the following compounds are obtained:

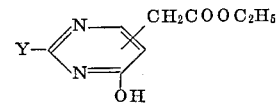

| Y | Recrystallisation solvent | Melting point (°C) |
|---|---|---|
| 4-bromophenyl | Ethanol [1] | 175–177 |
| 3,4-dichlorophenyl | Ethyl acetate | 178–182 |

[1] The treatment with chloroform is omitted in this case.

The ethyl 2-p-chlorobenzyl-4-hydroxypyrimid-5-ylacetate used as starting material may be obtained as follows:

5.75 parts of sodium are dissolved in 125 parts of dry ethanol, and a mixture of 50.5 parts of diethyl formyl succinate and 51.25 parts of α-4-chlorophenylacetamidine hydrochloride in 120 parts of dry ethanol are added. The mixture is heated under reflux for 6 hours, and then allowed to cool. The solid material is collected by filtration and crystallised from ethanol. There is thus obtained ethyl 2 - p - chlorobenzyl - 4 - hydroxypyrimid-5-ylacetate, M.P. 183–185° C.

EXAMPLE 9

Dry hydrogen is bubbled for 5 minutes through a mixture of 120 parts of dry benzene, 3.19 parts of phosphorus oxybromide and 1.1 parts of N,N-diethylaniline. 2.2 parts of ethyl 2-p-chlorophenyl-6-hydroxypyrimid-4-ylacetate are added and the mixture is refluxed under nitrogen for 3 hours, and then allowed to stand at ambient temperature for one day, The benzene is removed by evaporation under reduced pressure. The solid residue is stirred with 100 parts of ice and the aqueous suspension is extracted 3 times with 50 parts of ether. The ethereal extracts are combined, washed successively with 10 parts of water, 10 parts of saturated sodium bicarbonate solution and 10 parts of water, dried with anhydrous magnesium sulphate, and evaporated to dryness in vacuo. The residue is crystallised from ethanol. There is thus obtained ethyl 6-bromo-2-p-chlorophenylpyrimid-4-ylacetate, M.P. 89–90° C.

EXAMPLE 10

By a similar method to that described in Example 3 and using the appropriate 6-chloro compound as starting material the following compounds are obtained:

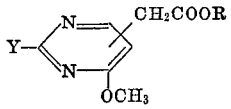

| Y | Position of acetic acid substituent | Crystallisation solvent for ester | M.P., °C., R is CH₃ | M.P., °C., R is H |
|---|---|---|---|---|
| 4-bromophenyl [1] | 4 | Petroleum ether (60–80° C). | 80.5–82 | 120–121 |
| Phenyl | 5 | Petroleum ether (80–100° C.). | 62–63 | 118–121 |
| 4-chlorobenzyl [1] | 5 | | | [2] |

[1] In these cases the methanol is evaporated before the addition of water. In each case the acidification of the filtrate is effected with glacial acetic acid (instead of 2N-hydrochloric acid).
[2] Softens at 65.5 M.P. 129–130.

EXAMPLE 11

11.18 parts of sodium are added to 1000 parts of dry methanol. 75.6 parts of ethyl 6-chloro-2-p-chlorophenyl-pyrimid-4-ylacetate are added, and the solution is stirred for 18 hours at ambient temperature. The solution is evaporated to a small volume under reduced pressure and the resulting mixture is filtered. The solid residue is shaken with 600 parts of chloroform, the insoluble material is removed by filtration (and dealt with further as described below) and the chloroform removed from the filtrate by evaporation under reduced pressure. The residual solid is crystallised from methanol and there is thus obtained methyl 2-p-chlorophenyl-6-methoxypyrimid-4-ylacetate, M.P. 78–80° C.

The material which is insoluble in chloroform is shaken with a mixture of 20 parts of water and 20 parts of chloroform. The two phases are separated and the aqueous phase is acidified with glacial acetic acid. The resulting mixture is filtered and the solid residue is dried. There is thus obtained 2-p-chlorophenyl-6-methoxypyrimid-4-ylacetic acid, M.P. 123° C.

In a similar manner using the appropriate 6-chloro compound as starting material, the following compounds can be obtained:

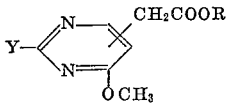

| Y | Position of acetic acid substituent | Crystallisation solvent for ester | M.P.° C. R is CH₃ | M.P.,° C., R is H |
|---|---|---|---|---|
| 3-chlorophenyl [1] | 4 | | | 88–91 |
| 3,4-dichlorophenyl | 4 | Petroleum ether (40–60 °C.). | 66–68 | |

[1] Ethyl 6-chloro-2-m-chlorophenylpyrimid-4-ylacetate (M.P. 80–82° C.) which is used as starting material is obtained by a similar method to that described in Example 8 from ethyl 2-m-chlorophenyl-6-hydroxypyrimid-4-yl-acetate (M.P. 236–238° C.), and the latter compound is likewise obtained by a similar method to that described in Example 8.

EXAMPLE 12

10 parts of ethyl 2-p-chlorophenyl-6-hydroxy-pyrimid-4-ylacetate are added at 0° C. to a solution of 7.18 parts of diazomethane in 1000 parts of ether. The mixture is stirred at 0° C. for 18 hours. The excess diazomethane is removed by distillation and the ether is then evaporated. The residual oil solidifies on cooling and is crystallised from ethanol with cooling to −40° C. There is thus obtained ethyl 2-p-chlorophenyl-6-methoxypyrimid-4-ylacetate, M.P. 65–66° C.

EXAMPLE 13

0.74 part of sodium is dissolved in 25 parts of dry ethanol, and a slurry of 5 parts of ethyl 6-chloro-2-p-chlorophenylpyramid-4-ylacetate and 60 parts of dry ethanol is added dropwise at a temperature below 15° C. The mixture is stirred for 3 hours at ambient temperature, and then kept for 48 hours at ambient temperature. The resulting mixture is filtered and 1 part of water is added to the filtrate. The resulting mixture is filtered and the crystalline solid residue and filtrate are retained. The filtrate is evaporated to dryness under reduced pressure, and the residue is crystallized from a mixture of ethanol and ether. The two crystalline solids are combined, triturated with 50 parts of ether and collected by filtration. There is thus obtained sodium 2-p-chlorophenyl-6-ethoxypyrimid-4-ylacetate monohydrate, M.P. 236° C. (with decomposition).

EXAMPLE 14

0.39 part of sodium is dissolved in 250 parts of liquid ammonia in the presence of a trace of ferric nitrate. When the formation of sodamide is complete, as shown by a colour change from dark blue to grey, a solution of 5 parts of methyl 2-p-chlorophenyl-6-methoxy pyrimid-4-ylacetate in 50 parts of dry ether is added. The mixture is refluxed for 45 minutes, and a solution of 2.44 parts of methyl iodide in 10 parts of dry ether is added. The mixture is stirred at −70° C. for 24 hours. 1.2 parts of ammonium chloride are added and the ammonia is allowed to evaporate. The residue is shaken with a mixture of equal parts of water and ether. After separation of the phases, the aqueous phase is extracted with ether. The combined ethereal solutions are washed with water until the washings are neutral, dried over anhydrous magnesium sulphate, filtered, and evaporated to dryness in vacuo. The residual oil is kept at ambient temperature for 3 days. The resulting mixture of crystalline solid and oil is filtered and both the oily solid residue and filtrate A (see Example 15) are retained. The oily solid residue is presesd between two porcelain tiles, to remove the oil. The resulting solid is triturated with petroleum ether, b.p. 40–60° C. There is thus obtained methyl α-[2-p-chlorophenyl-6-methoxy pyrimid-4-yl]propionate, M.P. 56.5–60° C.

EXAMPLE 15

0.157 part of sodium is dissolved in 50 parts of liquid ammonia in the presence of a trace of ferric nitrate. When the formation of sodamide is complete, a solution of 1 part of filtrate A (see Example 14) in 20 parts of ether is added, and the mixture is stirred for 1 hour. A solution of 0.971 part of methyl iodide in 10 parts of dry ether is added, and the mixture is stirred at −33° C. for 24 hours. 0.37 part of ammonium chloride is added and the ammonia is allowed to evaporate. The residue is shaken with a mixture of equal parts of water and ether, and after separation of the phases the aqueous phase is extracted twice with ether. The combined ethereal solutions are dried over anhydrous magnesium sulphate, filtered and evaporated to dryness under reduced pressure. The residual oil is purified by preparative thin layer chromatography on silica plates with a fluorescent indicator. The plates are developed in acetone/petrol 1:3. The area of silica containing the product is removed from the plate and extracted with chloroform. The chloroform solution is filtered and evaporated to dryness under reduced pressure. There is thus obtained methyl α[2-p-chlorophenyl-6-methoxypyrimid-4-yl]isobutyrate, M.P. 74.5–79.5° C.

EXAMPLE 16

5 parts of methyl 2-p-chlorophenyl-6-methoxy pyrimid-4-ylacetate are dissolved in 200 parts of dry methanol. 2.56 parts of 100% hydrazine hydrate are added, and the mixture is heated under reflux for 4 hours. After cooling, the methanol is removed by evaporation under reduced pressure. The solid residue is crystallised from ethanol and there is thus obtained 2-p-chlorophenyl-6-methoxy-pyrimid-4-ylacethydrazide, M.P. 154–155° C.

EXAMPLE 17

0.55 part of glycine ethyl ester hydrochloride are suspended in 5 parts of dry chloroform, and 0.4 part of triethylamine is added. After stirring for 15 minutes, the resulting solution is cooled in an ice bath and 1 part of 2-p-chlorophenyl-6-methoxypyrimid-4-ylacetic acid is added. 0.8 part of dicyclohexylcarbodiimide is added, the mixture is stirred at 0° C. for 2½ hours, then at ambient temperature for 2 days, and then filtered. The filtrate is washed twice, with 15 parts of saturated sodium bicarbonate solution. The organic solution is dried over anhydrous magnesium sulphate, filtered, and evaporated to dryness under reduced pressure. The residue is crystallised from ethanol. There is thus obtained ethyl α[2-p-chlorophenyl-6-methoxy pyrimid-4-ylacetamido]acetate, M.P. 119–121° C.

EXAMPLE 18

0.3 part of ethyl α-[2 - p - chlorophenyl - 6-methoxypyrimid-4-ylacetamide]acetate and 5 parts of 1 N-sodium hydroxide solution are stirred together at ambient temperature for 18 hours. The resulting mixture is filtered. The filtrate is acidified to pH2 with 2 N-hydrochloric acid and the precipitated solid is collected by filtration and crystallised from ethanol. There is thus obtained α-[2-p-chlorophenyl-6-methoxypyrimid - 4 - ylacetamido]acetic acid, M.P. 208–210° C.

EXAMPLE 19

To 0.5 part of 2-p-chlorophenyl-6-methoxypyrimid-4-ylacetic acid is added a solution of 0.04 part of sodium in 8 parts of dry ethanol. The mixture is stirred at ambient temperature for 2 hours and the ethanol is then removed by evaporation under reduced pressure. 0.27 part of diethylaminoethyl chloride dissolved in 10 parts of dry acetone is added to the residue and the mixture is heated under reflux for 18 hours, and then evaporated to dryness under reduced pressure. To the residue are added 10 parts of water, and the suspension is extracted 3 times with 5 parts of ether. The combined ethereal solution is washed with water, dried over anhydrous magnesium sulphate, filtered and evaporated to dryness under reduced pressure. The residual oil is stirred with 10 parts of 2 N-hydrochloric acid for 15 minutes and the solution is extracted 3 times with 5 parts of ether. The aqueous acid phase is basified with 2 N-sodium hydroxide and extracted 3 times with 10 parts of ether. The combined ethereal solution is washed twice with 5 parts of water, dried over anhydrous magnesium sulphate, filtered, and evaporated under reduced pressure. The residual oil is dissolved in ethyl acetate and a saturated solution of oxalic acid in dry ether is added. Dry ether is added to precipitate the oxalate as an oil. The solvents are decanted away from the oil, which is repeatedly dissolved in dry ethanol and reprecipitated with dry ether, until a solid is obtained. The solid is crystallised from a mixture of ethanol and ether. There is thus obtained β-diethylaminoethyl 2-p-chlorophenyl-6-methoxypyrimid-4-ylacetate acid oxalate, M.P. 120–122° C.

EXAMPLE 20

A mixture of 100 parts of dry toluene, 0.371 part of aluminium foil, 0.02 part of carbon tetrachloride, 0.0028 part of mercuric chloride, and 13.32 parts of dry benzylalcohol, is heated under reflux for 2 hours, by which time all the aluminium has dissolved. 3 parts of methyl 2-p-chlorophenyl-6-methoxypyrimid-4-ylacetate are added, and heating is continued for 4 hours. The solution is evaporated under reduced pressure at 60° C. The residual oil is mixed with 15 parts of water and extracted 3 times with 100 parts of ether. The combined ethereal solution is dried with anhydrous magnesium sulphate, filtered, and evaporated to dryness. The excess benzyl alcohol is removed by distillation at 0.2 mm. pressure and 60° C. The residual oily solid is crystallised from petroleum ether (B.P. 80–100° C.) and then from petroleum ether (B.P. 60–80° C.). There is thus obtained benzyl 2-p-chlorophenyl-6-methoxypyrimid-4-ylacetate, M.P. 90–92° C.

EXAMPLE 21

3 parts of methyl 2-p-chlorophenyl-6-methoxypyrimid-4-ylacetate are mixed with 10.2 parts of freshly distilled aluminium isopropoxide and 20 parts of dry toluene, and the mixture is refluxed for 4 hours and then kept for 18 hours at ambient temperature. The toluene is evaporated under reduced pressure and the residue is mixed with water, and ether. The resulting mixture is filtered, and both the solid residue and filtrate are retained. The solid residue is washed severel times with ether. The ethereal washings are combined with the abovementioned filtrate, and the ethereal phase is separated, dried over anhydrous magnesium sulphate, filtered, and evaporated under reduced pressure. The residual solid is crystallized from petroleum ether (B.P. 40–60° C.). There is thus obtained isopropyl 2-p-chlorophenyl-6-methoxypyrimid-4-ylacetate, M.P. 64–66° C.

EXAMPLE 22

1.79 parts of 2 N-sodium hydroxide solution are added to 1 part of 2 - p - chlorophenyl - 6 - methoxypyrimid-4-ylacetic acid. 10 parts of water are added, followed by a solution of 0.5 part of calcium chloride in 5 parts of water. The resulting precipitate is collected by filtration, washed with water and dried for 15 hours in vacuo at 100° C. There is thus obtained calcium 2-p-chlorophenyl-6-methoxypyrimid-4 - ylacetate monohydrate, M.P. 220–245° C.

EXAMPLE 23

The process described in Example 22 is repeated except that the 0.5 part of calcium chloride in 5 parts of water is replaced by 1.08 parts of aluminium sulphate tetradecylhydrate in 20 parts of water. In a similar manner there is obtained aluminum 2-p-chlorophenyl-6-methoxypyrimid-4-ylacetate hemihydrate, M.P. 208–212° C.

EXAMPLE 24

0.3 part of methyl 2-p-chlorophenyl-6-methoxypyrimid-4-ylacetate is dissolved in 10 parts of dry ether. A saturated solution of hydrogen chloride in dry ether is added until precipitation is complete. The precipitate is collected by filtration, washed with dry ether and crystallised from dry ethanol. There is thus obtained methyl 2-p-chlorophenyl-6-methoxypyrimid-4-ylacetate hydrochloride, M.P. 89.5–92° C.

EXAMPLE 25

1 part of methyl 2-p-chlorophenyl-6-methoxypyrimid-4-ylacetate and 0.536 part of freshly-fused sodium acetate are dissolved in 5 parts of stirred glacial acetic acid. 5.22 parts of bromine dissolved in 5 parts of glacial acetic acid are slowly added. The mixture is stirred for 1 hour at ambient temperature and then poured into 50 parts of water. 2 N-ammonium hydroxide solution is added until the mixture has pH 4, and the mixture is then extracted 3 times with 50 parts of ether. The combined ethereal extracts are washed twice with 10 parts of water, dried over anhydrous magnesium sulphate, filtered and evaporated to dryness. The residue is crystallised from petroleum ether (B.P. 60–80° C.). There is thus obtained methyl 2 - p - chlorophenyl - 6 - methoxypyrimid - 4 - yl - α,α-dibromoacetate, M.P. 139.5–142° C.

EXAMPLE 26

The process described in Example 25 is repeated except that 0.522 part of bromine is used in place of the 5.22 parts of bromine. The residue after evaporation of the ethereal extracts is purified by chromatography on a column containing magnesia-silica gel. The column is eluted with solvents increasing in polarity from petroleum ether (B.P. 60–80° C.) to a mixture of ethyl acetate-benzene (10:90 v./v.). The eluates are evaporated to dryness under reduced pressure. There is thus obtained methyl 2-p-chlorophenyl-6-methoxypyrimid-4-yl-α-bromo acetate, M.P. 84–88° C., and methyl 2-p-chlorophenyl-6-methoxypyrimid-4-yl-α,α-dibromoacetate, M.P. 139.5–142° C.

EXAMPLE 27

3 parts of 2-p-chlorophenyl-4-cyanomethylpyrimidine are warmed at 100° C. for 5 minutes together with 10 parts of 96% sulphuric acid. After cooling, the solution is poured into 100 parts of crushed ice, and the mixture is stirred, and neutralised at −10° C. with concentrated ammonium hydroxide solution. The resulting precipitate is collected by filtration, dried, and crystallised from ethanol. There is thus obtained 2-p-chlorophenylpyrimid-4-ylacetamide, M.P. 158–161° C.

EXAMPLE 28

3 parts of 2-p-chlorophenyl-4-cyanomethylpyrimidine are dissolved in a mixture of 8 parts of dry methanol and 30 parts of dry benzene. The solution is saturated at 0° C. with dry hydrogen chloride gas, and the mixture is kept at 5° C. for 3 days. The solvent is then removed by evaporation under reduced pressure, and 100 parts of water and 50 parts of benzene are added to the residue. After stirring for 1 hour, the mixture is separated and the aqueous phase is extracted with 50 parts of benzene. The combined benzene solutions are dried over anhydrous magnesium sulphate, filtered and and evaporated to dryness under reduced pressure. The solid residue is crystallised from petroleum ether (B.P. 60–80° C.) and then from methanol. There is thus obtained methyl 2-p-chlorophenylpyrimid-4-ylacetate, M.P. 82–83.5° C.

The 2-p-chlorophenyl-4-cyanomethylpyrimidine used as starting material in this example and in Example 27 may be obtained as follows:

9 parts of β-(2-p-chlorophenylpyrimid-4-yl)-α-oximinopropionic acid is heated at 100° C. with 30 parts of acetic anhydride. When gas evolution stops, the solution is cooled, poured into 150 parts of water, and warmed to 60° C. to destroy the excess of acetic anhydride. The crystalline precipitate is collected by filtration, dried, and crystallised from methanol. There is thus obtained 2-p-chlorophenyl-4-cyanomethylpyrimidine, M.P. 124–127° C.

The β-(2-p-chlorophenylpyrimid-4-yl)-α-oximino propionic acid used as starting material may be obtained as follows:

12 parts of ethyl β-(2-p-chlorophenylpyrimid-4-yl)-α-oximinopropionate are heated under reflux for 30 minutes with 150 parts of 2 N-sodium hydroxide solution and 50 parts of methanol. The solution is cooled, the methanol is removed by evaporation under reduced pressure, and the residue is acidified with 2 N-hydrochloric acid. The crystalline precipitate is collected by filtration, dried, and crystallised from methanol. There is thus obtained β-(2-p-chlorophenylpyrimid-4-yl)-α-oximinopropionic acid, M.P. 194–195° C.

The ethyl β-(2-p-chlorophenylpyrimid-4-yl)-α-oximinopropionate used as starting material may be obtained as follows:

50 parts of ethyl 2-p-chloropyrimid-4-yl-pyruvate are added to a mixture of 13.5 parts of fused sodium acetate and 11.4 parts of hydroxylamine hydrochloride in 30 parts of water and 400 ml. of ethanol. The mixture is heated under reflux for 2½ hours. Water is added carefully and, after cooling, the crystalline product is collected by filtration. There is thus obtained ethyl β-(2-p-chlorophenylpyrimid-4-yl)-α-oximinopropionate hemihydrate. This compound begins to melt at 64° C., and there is a tendency for it to resolidify at 80° C. If the sample is cooled until it is completely solid and then reheated, the melting point is 122–124° C.

The ethyl 2-p-chlorophenylpyrimid-4-ylpyruvate used as starting material may be obtained as follows:

12 parts of potassium are added to a mixture of 60 parts of dry ethanol and 750 parts of dry ether. When the potassium has dissolved, 40.65 parts of diethyl oxalate are added over a period of 10 minutes, followed by 62 parts of 2 - p - chlorophenyl - 4 - methylpyrimidine in 400 parts of ether. The mixture is kept at ambient temperature for 8 days and occasionally stirred. The precipitated solid is collected by filtration and washed with 200 parts of dry ether. The solid is dissolved in 600 parts of water, and the solution is washed with 200 parts of ether, and then acidified with glacial acetic acid. The resulting precipitate is collected by filtration and crystallised from ethanol. There is thus obtained ethyl 2 - p - chlorophenylpyrimid-4-ylpyruvate, M.P. 147–148° C.

2 - p - chlorophenyl - 4 - methylpyrimidine may be obtained as follows:

19.1 parts of p-chlorobenzamidine hydrochloride are dissolved in 75 parts of ethanol, and the solution is added to a solution of 2.5 parts of sodium in 75 parts of ethanol. The precipitated sodium chloride is removed by filtration and the filtrate is mixed with 13.2 parts of formyl acetone dimethyl acetal. After heating under reflux for 4 hours, the solution is cooled in ice and neutralised with acetic acid. The crystalline precipitate is collected by filtration and retained. The filtrate is evaporated to dryness under reduced pressure, and the solid residue is dissolved in ether. The ethereal solution is washed 3 times with 1 N-sodium hydroxide, dried over anhydrous magnesium sulphate, filtered, and evaporated to dryness under reduced pressure. The residue is crystallised from ethanol, and combined with the crystalline precipitate obtained above. The combined solids are crystallised from ethanol, and there is obtained 2 - p - chlorophenyl - 4 - methylpyrimidine, M.P. 87–90° C.

EXAMPLE 29

3 parts of a 50% dispersion of sodium hydride in oil are washed free of oil with petroleum ether (B.P. 60–80° C.) and added to 15 parts of diethyl carbonate. When the evolution of gas has ceased, 2 parts of 6-p-chlorophenyl - 2 - ethoxy - 4 - methylpyrimidine are added and the mixture is refluxed in an atmosphere of nitrogen for 90 minutes. The mixture is cooled and 30 parts of benzene are added. The mixture is filtered and the solid residue is washed well with dry benzene. The solid is then added carefully to 50 parts of ice water. The insoluble material is filtered off, and dissolved in 20 parts of 1 N-sodium hydroxide solution at 50° C. for 15 minutes. The solution is treated with decolourising carbon, filtered, and cooled. The resulting crystalline solid is collected by filtration, washed with a small amount of water, then with acetone, and dried. There is thus obtained sodium 6 - p - chlorophenyl - 2 - ethoxy - pyrimid - 4 - ylacetate hemihydrate, M.P. 178–182° C.

The 6 - p - chlorophenyl - 2 - ethoxy - 4 - methylpyrimidine used as starting material may be obtained as follows:

3.6 parts of 2 - chloro - 6 - p - chlorophenyl - 4 - methylpyrimidine are heated under reflux for 1 hour with a solution of 0.7 part of sodium in 50 parts of dry ethanol. After cooling, the ethanol is removed by evaporation under reduced pressure. 20 parts of water are added to the residue, and the solid material is extracted into 50 parts of ether. The aqueous phase is extracted twice with 50 parts of ether, and the combined ethereal solution washed with 20 parts of water, dried over anhydrous magnesium sulphate, filtered, and evaporated to dryness under reduced pressure. There is thus obtained 6-p-chlorophenyl-2-ethoxy-4-methylpyrimidine, M.P. 68–69° C.

The 2 - chloro - 6 - p - chlorophenyl - 4 - methylpyrimidine used as starting material may be obtained as follows:

14.7 parts of 6 - p - chlorophenyl - 2 - hydroxy - 4- methylpyrimidine are mixed with 60 parts of phosphorus oxychloride and 10 parts of N,N-diethylaniline and heated under reflux for 2½ hours. After cooling, the excess phosphorus oxychloride is removed by evaporation under reduced pressure, and the residue is poured into 500 parts of ice water. The resulting precipitate is extracted into benzene, the benzene extract is washed with 50 parts of water, dried over anhydrous magnesium sulphate, filtered, and evaporated to dryness under reduced pressure. The solid residue is crystallised from petroleum ether, (B.P. 60–80° C.). There is thus obtained 2-chloro-6-p-chlorophenyl-4-methylpyrimidine, M.P. 115–117° C.

The 6 - p - chlorophenyl - 2 - hydroxy - 4 - methylpyrimidine used as starting material may be obtained as follows:

15.2 parts of 2 - amino - 6 - p - chlorophenyl - 4 - methylpyrimidine are heated under reflux for 18 hours with 150 parts of concentrated hydrochloric acid. After cooling, the solution is diluted with water, and the pH adjusted to 7 by the addition of concentrated sodium hydroxide solution. The resulting precipitate is collected by filtration, washed with water, and dried. There is thus obtained 6 - p - chlorophenyl - 2 - hydroxy - 4 - methylpyrimidine, M.P. 274–280° C.

The 2-amino-6-p-chlorophenyl-4-methylpyrimidine used as starting material may be obtained as follows:

18 parts of guanidine carbonate are intimately mixed with 21.6 parts of p-chlorobenzoyl acetone, and the mixture is heated at 140° C., for 1 hour. After 30 minutes the reaction mixture solidifies. After cooling the solid is shaken for 5 minutes with 100 parts of water, and the mixture is filtered. The solid residue is heated under reflux for 10 minutes with 300 parts of ethanol, and then cooled. The crystalline precipitate is collected by filtration and dried. There is thus obtained 2-amino-6-p-chlorophenyl-4-methylpyrimidine, M.P. 199–202° C.

EXAMPLE 30

4 parts of sodium 6-p-chlorophenyl-2-ethoxypyrimid-4-ylacetate are dissolved in 100 parts of water, and the solution is acidified with glacial acetic acid. The precipitate is collected by filtration, washed with water, and dried. There is thus obtained 6-p-chlorophenyl-2-ethoxypyrimid-4-ylacetic acid, M.P. 85–86° C.

EXAMPLE 31

The procedure described in Example 27 is repeated except that 4-p-chlorophenyl-2-cyanomethylpyrimidine is used in place of 2-p-chlorophenyl-4-cyanomethylpyrimidine. There is thus obtained 4-p-chlorophenylpyrimid-2-yl-acetamide, M.P. 164–165.5° C.

By repeating the procedures described in Example 28 and using the appropriate starting materials, the following intermediates (required for the preparation of 4-p-chlorophenylpyrimid-2-ylacetate) are obtained: 4 - p-chlorophenyl - 2 - cyanomethylpyrimidine, M.P. 113–115° C., $\beta$-(4 - p - chlorophenylpyrimid - 2 - yl) - $\alpha$ oximino propionic acid, M.P. 174–176° C., and ethyl $\beta$-(4-p-chlorophenylpyrimid -2 - yl) - $\alpha$ - oximinopropionate, M.P. 166–170.5° C.

The ethyl 4 - p - chlorophenylpyrimid - 2 - ylpyruvate used as starting material in the preparation of the last-named compound may be obtained as follows:

20.4 parts of 4-p-chlorophenyl-2-methylpyrimidine are dissolved in 200 parts of dry dimethylformamide. 36.5 parts of diethyloxalate are added, followed by 7.2 parts of a 50% dispersion of sodium hydride in oil. The mixture is heated to 65° C., whereupon a vigorous exothermic reaction begins. When the reaction is complete, the mixture is cooled, poured into 1000 parts of water, and acidified with glacial acetic acid. The suspension is stirred for one hour, and the precipitate is then collected by filtration, dried and crystallised from ethyl acetate. There is thus obtained ethyl 4 - p-chlorophenylpyrimid-2-yl-pyruvate, M.P. 153–155° C.

The 4 - p-chlorophenyl - 2 - methylpyrimidine used as starting material may be obtained as follows:

29 parts of sodium are dissolved in 600 parts of dry ethanol. The solution is cooled and 119 parts of acetamidine hydrochloride are added. After stirring for 30 minutes, the precipitated sodium chloride is removed by filtration and the filtrate is cooled to 10° C. 63.3 parts of p-chlorophenyl $\beta$-chlorovinyl ketone dissolved in 150 parts of dry ethanol are added at such a rate that the temperature does not exceed 10° C. The mixture is stirred at ambient temperature for 30 minutes. The solution is then evaporated to dryness under reduced pressure, and the residue is crystallised from ethanol (with cooling at —40° C.). The crystalline solid is collected by filtration, and dried. The filtrate is evaporated to dryness, and the residue is dissolved in 500 parts of 2 N-hydrochloric acid. The solution is washed 3 times with 100 parts of ether, treated with decolourising carbon, filtered, and adjusted to pH 6 with sodium hydroxide solution. The resulting mixture is filtered, combined with the above-mentioned, crystalline solid. The solid is dissolved as far as possible in petroleum ether (B.P. 60–80° C.), under reflux, the mixture is filtered while hot, and the filtrate is allowed to cool to ambient temperature. The resulting mixture is filtered. There is thus obtained, as solid residue, 4-p-chlorophenyl-2-methylpyrimidine, M.P. 92.5–94.5° C.

EXAMPLE 32

2.9 parts of 2-p-chlorobenzyl-6-methoxypyrimid-5-ylacetic acid and 1.16 parts of N,N-diethylethylenediamine are dissolved in 30 parts of dry chloroform, and the solution is stirred and cooled to 0° C. 2.23 parts of dicyclohexylcarbodiimide are added, and the mixture is kept at ambient temperature for 4 days. The resulting precipitate is removed by filtration, and the filtrate is evaporated to dryness. The residual oil is dissolved in 4 parts of ethyl acetate, and the solution is cooled in ice for 30 minutes and the resulting mixture filtered. The filtrate is evaporated to dryness, and the residue is dissolved in 20 parts of ether. The ethereal solution extracted 4 times with 10 parts of water, and then 3 times with 15 parts of 2 N-acetic acid. The aqueous acid layer is made alkaline, and extracted 3 times with 20 parts of ether. The ethereal extract is dried over anhydrous magnesium sulphate, filtered, and evaporated to dryness in vacuo. The solid residue is crystallised from petroleum ether (B.P. 60–80° C.). There is thus obtained N-$\beta$-diethylaminoethyl-(2-p-chlorobenzyl - 6 - methoxypyrimid - 5 - yl)acetamide, M.P. 107–109° C.

EXAMPLE 33

13.75 parts of carboxamidoacetamidine hydrochloride are added to a solution of 2.5 parts of sodium in 300 parts of dry ethanol. When precipitation is complete, the precipitated sodium chloride is removed by filtration, and the filtrate is mixed with 20.75 parts of $\alpha$-p-chlorophenyl-$\beta$-dimethylaminoacrolein. The mixture is heated under reflux for 4 hours, and then kept at ambient temperature for 18 hours. The mixture is filtered and the solid residue is crystallised from a mixture of ethanol and dimethylformamide. There is thus obtained 5-p-chlorophenylpyrimid-2-ylacetamide, M.P. 230–239° C. (change of crystalline form commencing at 210° C.).

The $\alpha$-p-chlorophenyl-$\beta$-dimethylaminoacrolein used as starting material may be obtained as follows:

230 parts of redistilled phosphorus oxychloride are slowly added to 182.5 parts of stirred dry dimethyl formamide at 0° C. 85.25 parts of p-chlorophenylacetic acid are added to the mixture, and the resulting solution is stirred at 70° C. for 6 hours. After cooling, the mixture is poured into 400 parts of ice and neutralised with concentrated sodium hydroxide solution. 800 parts of potassium carbonate and 250 parts of benzene are added, and the mixture is stirred and heated under reflux at 90° C. for 1 hour; the mixture is cooled and separated. The aqueous phase is extracted 4 times with 250 parts of benzene. The combined benzene extracts are washed with 250 parts of water, dried over anhydrous magnesium sulphate, filtered and evaporated to dryness in vacuo. The solid residue is crystallised from benzene. There is thus obtained $\alpha$-p-chlorophenyl-$\beta$-dimethylaminoacrolein, M.P. 119–120° C.

EXAMPLE 34

5 parts of 5-p-chlorophenylpyrimid-2-ylacetamide are stirred with 500 parts of dry ethanol. Dry hydrogen chloride gas is passed through the mixture for 4 hours while heating under reflux. After cooling, the ethanol is evaporated in vacuo. 10 parts of water are added, the suspension is shaken with 20 parts of saturated sodium bicarbonate solution, and the resulting solid material is extracted into 100 parts of ether. The ethereal solution is dried with anhydrous magnesium sulphate, filtered, and evaporated to dryness in vacuo. The solid residue is crystallised from ethanol. There is thus obtained ethyl 5-p-chlorophenylpyrimid-2-ylacetate, M.P. 74–75.5° C.

EXAMPLE 35

The process described in Example 33 is repeated except that α-carboxamidopropionamidine hydrochloride is used in place of carboxamidoacetamidine hydrochloride. There is thus obtained α-[5-p-chlorophenylpyrimid-2-yl]propionamide, M.P. 228–229° C. (crystallised from methanol).

EXAMPLE 36

The process described in Example 34 is repeated except that α-[-p-chlorophenylpyrimid-2-yl]propionamide is used in place of 5-p-chlorophenylpyrimid-2-yl-acetamide, and methanol is used instead of ethanol. The product is purified by preparative thin layer chromatography on silica plates with a fluorescent indicator. Elution of the plates is carried out with acetone/petroleum ether (B.P. 80–100° C.) 1:3. The required bands are scraped from the plates, and material is recovered by extraction of the silica with acetone. After filtration, the acetone is evaporated in vacuo and the residue is crystallised from aqueous methanol. There is thus obtained methyl α-[5-p-chlorophenylpyrimid-2-yl-]propionate, M.P. 73–76° C.

EXAMPLE 37

Ethyl 6-chloro-2-p-trifluoromethylphenylpyrimid-4-ylacetate (M.P. 45–47° C.), is obtained from the corresponding 6-hydroxy compound. (M.P. 200–201°), in analogous manner to that described in Example 1.

The 6-hydroxy compound used as starting material may be obtained from p-trifluoromethylbenzamidine hydrochloride in analogous manner to that described in Example 1.

p-Trifluoromethylbenzamidine hydrochloride itself is obtained as follows:

12.2 parts of p-trifluoromethylbenzonitrile are dissolved in a mixture of 9 parts of dry ethanol and 20 parts of dry benzene. 8 parts of dry hydrogen chloride are passed into this solution below 5° C., and the resulting mixture is kept at 0° C. for 3 days and then evaporated to dryness in vacuo. The residue is dissolved in 200 parts of ethanol saturated with dry ammonia, and the mixture is stirred for 3 days at 37° C. The mixture is evaporated to dryness in vacuo, and the residual gum is washed with dry ethyl acetate and filtered. The residue is dried and crystallised from water. There is thus obtained p-trifluoromethylbenzamidine hydrochloride, M.P. 165–169° C.

EXAMPLE 38

7.6 parts of ethyl 6-chloro-2-p-trifluoromethylphenylpyrimid-4-ylacetate are added to a solution of 1 part of sodium in 100 parts of methanol. The mixture is refluxed for 2 hours and then evaporated to dryness. The residue is extracted with 250 parts of cold chloroform, and the resulting mixture is filtered. The solid residue is washed well with petroleum ether (B.P. 60–80° C.), and then dissolved as far as possible in 400 parts of ice cold water, and the mixture is filtered. The filtrate is acidified at 0° C. with acetic acid, and the resulting solid is collected by filtration, washed with water and dried in vacuo. There is thus obtained 6-methoxy-2-p-trifluoromethylpyrimid-4-ylacetic acid, M.P. 50–52° C. with decomposition.

EXAMPLE 39

18.4 parts of ethyl 2-p-chlorophenyl-6-hydroxy-4-methylpyrimid-5-ylacetate, 30 parts of phosphoryl choride, and 150 parts of benzene are refluxed for 3 hours. The mixture is cooled and poured onto 250 parts of ice and water. This mixture is stirred, and sodium bicarbonate is added until the aqueous layer is no longer acid. The benzene layer is separated, washed with water, dried over anhydrous magnesium sulphate and evaporated to dryness. The residual solid is crystallised from ethanol, and there is obtained ethyl 6-chloro-2-p-chlorophenyl-4-methylpyrimid-5-ylacetate, M.P. 105–106° C.

Ethyl 2-p-chlorophenyl-6-hydroxy-4-methylpyrimid-5-ylacetate may be obtained as follows:

4.4 parts of sodium are dissolved in 250 parts of ethanol, and 36 parts of p-chlorobenzamidine hydrochloride and 41 parts of diethylacetylsuccinate are added. The mixture is stirred at room temperature for 2 hours, and then boiled under reflux for 2 hours. The resulting mixture is extracted with 1300 parts of chloroform, and the chloroform extract is filtered. The filtrate is evaporated to dryness, and the solid residue is crystallised from ethanol. There is thus obtained ethyl 2-p-chlorophenyl-6-hydroxy-4-methylpyrimid-5-ylacetate, M.P. 236–237° C.

EXAMPLE 40

5 parts of ethyl 6-chloro-2-p-chlorophenyl-4-methylpyrimid-5-ylacetate, 5 parts of zinc dust, and 3 parts of ammonium chloride are refluxed for 24 hours in a mixture of 40 parts of dioxan and 100 parts of water. 25 parts of 40% aqueous sodium hydroxide are then added and the mixture boiled for 90 minutes and then filtered. The cooled filtrate is acidified to pH 5 with glacial acetic acid, and then extracted with 4 portions of 50 parts of ethyl acetate. The combined ethyl acetate extracts are extracted with 4 portions of 50 parts of 5% aqueous ammonium hydroxide. The combined aqueous extract are washed with 120 parts of petroleum ether (B.P. 100–120° C.). The aqueous solution is acidified while hot to pH 5 with acetic acid, and the mixture is then cooled to ambient temperature. The resulting mixture is filtered, and the solid residue is crystallised twice from a mixture of benzene and petroleum ether (B.P. 60–80° C.) there is obtained 2-p-chlorophenyl-4-methylpyrimid-5-ylacetic acid, M.P. 167° C.

EXAMPLE 41

1 part of sodium is dissolved in 50 parts of methanol and 7 parts of ethyl 6-chloro-2-p-chlorophenyl-4-methylpyrimid-5-ylacetate are added. The mixture is refluxed for 16 hours. The mixture is evaporated to dryness, and 60 parts of water and 10 parts of 40% aqueous sodium hydroxide are added to the residue. The resulting mixture is refluxed for 1 hour. The solution is acidified with acetic acid, and extracted 4 times with ethyl acetate (50 parts each time). The combined ethyl acetate extracts are washed with water and then dried over anhydrous magnesium sulphate. The solvent is evaporated and the residue is crystallised from a 1:1 mixture of benzene and petroleum ether (B.P. 60–80° C.). There is thus obtained 2-p-chlorophenyl-6-methoxy-4-methylpyrimid-5-ylacetic acid, M.P. 193–194° C.

EXAMPLE 42

Ethyl 4-chloro-2-p-fluorophenylpyrimid-5-ylacetate (M.P. 96–97° C.) is obtained from the corresponding 4-hydroxy compound by a similar process to that described in Example 5.

EXAMPLE 43

2-p-fluorophenyl-4-methoxypyrimid-5-ylacetatic acid (M.P. 184° C.) is obtained from ethyl 4-chloro-2-p-fluorophenylpyrimid-5-ylacetate (see Example 42) by a similar process to that described in Example 7.

EXAMPLE 44

A mixture of 3.75 parts of sodium hydride and 35 parts of diethyl carbonate is stirred under a nitrogen atmosphere and heated under reflux for five minutes. 7.39 parts of 4,6-dimethyl-2-phenylpyrimidine are added and the mixture is stirred and refluxed under nitrogen for two hours. The cooled mixture is stirred with 200 parts of benzene, filtered, and the solid residue is washed with 50 parts of dry benzene. The combined filtrate and washing is washed with 100 parts of saturated sodium bicarbonate solution and then evaporated to remove benzene and excess diethyl carbonate. The residue is crystallised three times from petroleum ether (B.P. 60–80° C.). There is thus obtained diethyl 2-(4-methyl-2-phenylpyrimid-6-yl)malonate, M.P. 50–51° C.

EXAMPLE 45

A mixture of 1 part of diethyl 2-(4-methyl-2-phenylpyrimid-6-yl)malonate, 0.4 part of sodium hydroxide, 1 part of water and 10 parts of methanol is heated under reflux for one hour. The mixture is evaporated, and the residue is distributed between 5 parts of water and 10 parts of ether. The aqueous phase is separated from the mixture, and saturated with sodium chloride. The resulting mixture is cooled in ice, filtered, and the solid residue is washed with saturated aqueous sodium chloride. The solid is dissolved as far as possible in 5 parts of t-amyl alcohol under reflux, filtered while hot, and the cooled filtrate is diluted with ether to turbidity and the product allowed to crystallise. There is thus obtained sodium 4-methyl-2-phenylpyrimid-6-ylacetate tetrahydrate, M.P. 208–210° C. after shrinking and losing water at 68–70° C.

Metathesis of the above salt in water with dicyclohexylammonium acetate and crystallisation from water and then from ethyl acetate with addition of petroleum ether (B.P. 60–80° C.) yields dicyclohexylammonium 4-methyl-2-phenylpyrimid-6-ylacetate monohydrate, M.P. 126–127° C.

EXAMPLE 46

The process described in Example 44 is repeated except that 2-p-chlorophenyl-4,6-dimethylpyrimidine is used as starting material in place of 4,6-dimethyl-2-phenylpyrimidine. There is thus obtained diethyl 2-(2-p-chlorophenyl-4-methylpyrimid-6-yl)malonate, M.P. 88–90° C.

The 2-p-chlorophenyl-4,6-dimethylpyrimidine used as starting material may be obtained as follows:

A mixture of 10 parts of p-chlorobenzamidine hydrochloride, 5.3 parts of acetylacetone, 7 parts of potassium carbonate and 35 parts of water is heated at 100° C. for two hours. The aqueous phase is decanted while still hot from the oily products and the oil is washed twice by decantation with 50 parts of hot water each time. The oil is dissolved as far as possible in 50 parts of methanol under reflux, then the mixture is filtered, and the filtrate is slowly diluted with 50 parts of water, while allowing the product to crystallise. There is thus obtained 2-p-chlorophenyl-4,6-dimethylpyrimidine, M.P. 101–103° C.

EXAMPLE 47

The process described in Example 44 is repeated except that 2-p-chlorophenyl-5,6-dimethylpyrimidine is used as starting material in place of 4,6-dimethyl-2-phenylpyrimidine. There is thus obtained diethyl 2-(2-p-chlorophenyl-5-methylpyrimid-6-yl)malonate, M.P. 95–96° C.

The 2-p-chlorophenyl-5,6-dimethylpyrimidine used as starting material may be obtained as follows:

A mixture of 5 parts of 4-chloro-2-p-chlorophenyl-5,6-dimethylpyrimidine, 8 parts of zinc dust, 8 parts of ammonium chloride, 60 parts of water and 40 parts of dioxan is heated under reflux for 24 hours. The mixture is cooled and poured into a mixture of 500 parts of water and 10 parts of acetic acid. The mixture is extracted with ether, and the ether is evaporated. The residue is crystallised from methanol (charcoal treatment). There is thus obtained 2-p-chlorophenyl-5,6-dimethylpyrimidine, M.P. 113° C.

4-chloro-2-p-chlorophenyl-5,6-dimethylpyrimidine itself may be obtained as follows:

A mixture of 20 parts of p-chlorobenzamidine hydrochloride, 8 parts of anhydrous potassium carbonate, 20 parts of ethyl 2-methylacetoacetate, 40 parts of ethanol, and 80 parts of water is heated under reflux at 100° C. for 5 hours. The mixture is cooled and filtered, and the solid residue is washed with water and ethanol. There is thus obtained 2-p-chlorophenyl-5,6-dimethyl-4-hydroxypyrimidine, M.P. 290–294° C. A mixture of 15 parts of this 4-hydroxy compound and 20 parts of phosphorus oxychloride is heated at 100° C. for 2 hours. The mixture is poured on to ice, and the precipitated solid is collected by filtration and crystallised from ethanol. There is thus obtained 4-chloro-2-p-chlorophenyl-5,6-dimethylpyrimidine, M.P. 124.5–126.5° C.

EXAMPLE 48

The process described in Example 44 is repeated except that 2-p-chlorophenyl-4-methoxy-6-methylpyrimidine is used as starting material in place of 4,6-dimethyl-2-phenylpyrimidine, and the benzene-soluble and insoluble materials are not separated before the wash with saturated sodium bicarbonate solution. There is thus obtained diethyl 2-(2-p-chlorophenyl-4-ethoxypyrimid-6-yl)malonate M.P. 71–71.5° C.

The 2-p-chlorophenyl-4-methoxy-6-methylpyrimidine used as starting material may be obtained as follows:

5.65 parts of 4-chloro-2-p-chlorophenyl-6-methylpyrimidine are added to a solution of 1.12 parts of sodium in 80 parts of methanol, and the mixture is heated under reflux for two hours. The methanol is evaporated, the residue is dissolved as far as possible in 40 parts of hot methanol, and the mixture filtered. The filtrate is cooled and water is added until crystallisation commences. The mixture is set aside until crystallisation is complete, and is then filtered. There is thus obtained, as solid residue, 2-p-chlorophenyl-4-methoxy-6-methylpyrimidine, M.P. 56–57° C.

EXAMPLE 49

A mixture of 0.7 part of sodium hydride and 5 parts of dimethyl carbonate is stirred and heated under reflux for ten minutes under nitrogen. 1.4 parts of 2-p-chlorophenyl-4-methoxy-6-methylpyrimidine are then added and the mixture is stirred and refluxed under nitrogen for 18 hours. A mixture of 10 parts of xylene and 5 parts of dimethyl carbonate is added, and the mixture is heated and stirred for three hours. The mixture is cooled to 0° C. and stirred vigorously while 5 parts of acetic acid are added as rapidly as possible. The resulting slurry is distributed between 100 parts of water and 70 parts of ether. The organic phase is separated from the mixture, washed with 50 parts of saturated aqueous sodium bicarbonate, and evaporated. The residue is crystallised from petroleum ether (B.P. 60–80° C.) (charcoal treatment), and from aqueous methanol (charcoal treatment). There is thus obtained dimethyl 2-(2-p-chlorophenyl-4-methoxypyrimid-6-yl)malonate, M.P. 83–83.5° C.

EXAMPLE 50

Methyl 6-chloro-2-p-chlorophenyl Pyrimid-4-ylacetate (M.P. 86.5–87.5° C.) is prepared in a manner similar to that described in Example 1, except that methyl 2-p-chlorophenyl-6-hydroxypyrimid-4-ylacetate is used in place of ethyl 2-p-chlorophenyl-6-hydroxypyrimid-4-ylacetate.

The methyl 2-p-chlorophenyl-6-hydroxypyrimid-4-ylacetate used as starting material may be obtained as follows:

2.4 parts of sodium are dissolved in 150 parts of dry methanol, 20 parts of p-chlorobenzamidine hydrochloride are added to the solution, and the mixture is stirred for 30 minutes at ambient temperature. 18.2 parts of dimethyl acetonedicarboxylate are added and the mixture is heated under reflux for 6 hours. After cooling, the mixture is filtered, both the solid residue and the filtrate (A) being retained. The solid residue is stirred with 50 parts of water for 5 minutes, and the mixture is filtered. The solid residue is retained (B).

The filtrate (A) is evaporated to dryness under reduced pressure. 150 parts of water are added to the residue, and the mixture is stirred for 5 minutes and then filtered. The solid residue is dried, stirred for 5 minutes with 50 parts of chloroform, and the mixture is filtered. The solid residue is dissolved in a mixture of 10 parts of methanol and 90 parts of chloroform. The solution is passed through a column of 130 parts of magnesia-silica gel. The column is eluted with 2000 parts of a 5:95 v./v. methanol:chloroform mixture. The solvent is evaporated from the eluate under reduced pressure. The residual solid is combined with solid (B) described above and the combined solids are crystallised from methanol. There is thus obtained methyl 2-p-chlorophenyl - 6 - hydroxypyrimid-4-ylacetate, M.P. 184.5–186.5° C.

EXAMPLE 51

Methyl 2-p-chlorophenyl-6-methoxypyrimid-4-ylacetate (M.P. 78–80° C.) is prepared in a manner similar to that described in Example 11 except that methyl 6-chloro-2-p-chlorophenylpyrimid-4-ylacetate is used in place of ethyl 6-chloro-2-p-chlorophenylpyrimid-4-ylacetate.

EXAMPLE 52

A mixture of 100 parts of methyl 2-p-chlorophenyl-6-methoxypyrimid-4-ylacetate and 300 parts of maize starch is granulated with a sufficient quantity of 10% w/v starch paste. The granules are passed through a 20 mesh screen and are then dried at a temperature not exceeding 40° C. The dried granules are then blended with 4 parts of magnesium stearate and then compressed into tablets which may contain from 50 to 250 mgs. of active ingredient. There are thus obtained tablets suitable for oral use for therapeutic purposes.

Instead of the 100 parts of methyl 2-p-chlorophenyl-6-methoxypyrimid-4-ylacetate there may be used 100 parts of 2-p-chlorophenyl-6-methoxy-4-methylpyrimid-5-ylacetic acid or 100 parts of diethyl-2-p-chlorophenyl-6-methoxypyrimid-4-ylmalonate, and in a similar manner there are obtained tablets suitable for oral administration for therapeutic purposes.

EXAMPLE 53

5 parts of methyl 2-p-chlorophenyl-6-methoxy-pyrimid-4-ylacetate are added to a stirred mixture of 9 parts of liquid paraffin and 86 parts of soft white paraffin heated at 65° C. The mixture is allowed to cool and stirring is continued until the mixture is cool. There is thus obtained an ointment suitable for topical application for therapeutic purposes.

EXAMPLE 54

To a stirred mixture of 20 parts of stearic acid, 15 parts of arachis oil, 5 parts of liquid paraffin and 5 parts of cetostearyl alcohol, heated at 65° C., there is added a solution at 60° C. prepared from 5 parts of 2-p-chlorophenyl-6-methoxy-4-methylpyrimid-5-ylacetic acid, 2.5 parts of triethanolamine and 53.5 parts of water. Stirring is continued after mixing while the temperature is allowed to fall to 40° C. The mixture is then homogenised by passage through a colloid mill. There is thus obtained a vanishing cream suitable for topical application for therapeutic purposes.

The pyrimidine derivatives of this invention possess anti-inflammatory, analgesic and antipyretic activity, for example such activity in standard experimental animals (rats or mice), and they may therefore be used in the treatment of man or other host needing such activity. On the basis of results in standard experimental animals we consider that said pyrimidine derivatives may be used clinically in man in the formulations and at the doses indicated below, depending upon the clinical effect that is desired:

(1) Anti-inflammatory effect

Said pyrimidine derivative, for example methyl 2-p-chlorophenyl-6-methoxypyrimid-4-ylacetate, may be administered orally in the form of a tablet at a total daily dose of 100–500 mg. of said derivative per 70 kg. man. Alternatively, said derivative may be administered topically in the form of an ointment or cream containing 2.5–7.5% by weight of said derivative, the ointment or cream being administered as necessary.

(2) Analgesic effect

Said pyrimidine derivative may be administered orally in the form of a tablet at a total daily dose of 100–600 mg. of said derivative per 70 kg. man.

(3) Antipyretic effect

Said pyrimidine derivative may be administered orally in the form of a tablet at a total daily dose of 100–500 mg. of said derivative per 70 kg. man.

What we claim is:

1. A pyrimidine derivative of the formula:

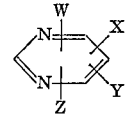

wherein:

Y and Z are linked to non-adjacent carbon atoms in the pyrimidine nucleus;

W stands for hydrogen or straight chain alkyl of not more than three carbon atoms;

X stands for hydrogen, straight chain alkyl of not more than three carbon atoms, straight chain alkoxy of not more than three carbon atoms, or a halogen atom;

Y stands for monohalogenophenyl, dihalogenophenyl, monohalogenobenzyl, dihalogenobenzyl, trifluoromethylphenyl or trifluoro methylbenzyl; and Z stands for —$CR^1R^2R^3$ wherein $R^1$ stands for hydrogen, straight chain alkyl of not more than three carbon atoms, or a chlorine or bromine atom, $R^2$ stands for hydrogen, straight chain alkyl of not more than three carbon atoms, alkoxycarbonyl of not more than three carbon atoms, or a chlorine or a bromine atom, and $R^3$ stands for —$CO_2R^4$ or —$CONHR^5$, wherein $R^4$ stands for hydrogen, alkyl of not more than three carbon atoms, dialkylaminoalkyl of not more than six carbon atoms, or benzyl, and $R^5$ stands for hydrogen, amino, dialkylaminoalkyl of not more than six carbon atoms, alkoxycarbonylalkyl of not more than four carbon atoms, or carboxymethyl, or the non-toxic pharmaceutically acceptable salts thereof.

2. A compound as claimed in claim 1 which is diethyl 2-(2-p-chlorophenyl-6-methoxypyrimid-4-yl)malonate.

3. A compound as claimed in claim 1 which is 2-p-chlorophenyl-6-methoxy-4-methylpyrimid-5-ylacetic acid.

4. A compound as claimed in claim 1 which is methyl α-(2-p-chlorophenyl-6-methoxypyrimid-4-yl) propionate.

5. A compound as claimed in claim 1 which is methyl 2-p-chlorophenyl-6-methoxypyrimid-4-ylacetate.

References Cited

UNITED STATES PATENTS 3,225,047    12/1965    Partyka _____ 260—256.4

OTHER REFERENCES

Verma et al., C.A. 59, 7522f (1963)

ALEX MAZEL, Primary Examiner

R. V. RUSH, Assistant Examiner

U.S. Cl. X.R.

260—256.4; 424—251